(12) United States Patent
Hung et al.

(10) Patent No.: US 7,337,820 B2
(45) Date of Patent: Mar. 4, 2008

(54) BARRIER FILM ENCAPSULATING APPARATUS FOR INSULATING PIPE

(75) Inventors: Ming-Lang Hung, Hsinchu (TW); Chih-Chen Chang, Hsinchu (TW); Pen-Chang Tseng, Hsinchu (TW)

(73) Assignee: Industrial Technology Research Institute, Hsingchu Hsien (TW)

( * ) Notice: Subject to any disclaimer, the term of this patent is extended or adjusted under 35 U.S.C. 154(b) by 0 days.

(21) Appl. No.: 10/978,437

(22) Filed: Nov. 2, 2004

(65) Prior Publication Data

US 2005/0284580 A1 Dec. 29, 2005

(30) Foreign Application Priority Data

Jun. 23, 2004 (TW) ................ 93118032 A

(51) Int. Cl.
B65B 81/02 (2006.01)
B65H 81/06 (2006.01)

(52) U.S. Cl. ..................... 156/392; 156/465

(58) Field of Classification Search ............... 156/201, 156/203, 217, 218, 392, 461, 465, 466
See application file for complete search history.

(56) References Cited

U.S. PATENT DOCUMENTS

| | | | | |
|---|---|---|---|---|
| 1,969,947 A | * | 8/1934 | Rosener | 156/392 |
| 3,011,933 A | * | 12/1961 | Barnes et al. | 156/201 |
| 3,817,813 A | * | 6/1974 | Keith et al. | 156/429 |
| 4,025,375 A | * | 5/1977 | Leasure | 156/79 |
| 4,134,782 A | * | 1/1979 | Straughan | 156/79 |
| 4,287,011 A | * | 9/1981 | Derbyshire | 156/85 |
| 4,886,130 A | * | 12/1989 | Evans | 175/73 |

FOREIGN PATENT DOCUMENTS

| | | |
|---|---|---|
| TW | 231746 | 1/1983 |
| TW | 263049 | 3/1984 |
| TW | 463903 | 4/1989 |
| TW | 439928 | 6/1989 |

* cited by examiner

*Primary Examiner*—Richard Crispino
*Assistant Examiner*—Barbara J. Musser
(74) *Attorney, Agent, or Firm*—Birch, Stewart, Kolasch & Birch, LLP

(57) ABSTRACT

A barrier film encapsulating apparatus for insulating pipes is proposed, the apparatus comprises: a positioning unit for positioning a insulating pipe to be encapsulated with a barrier film and moving the insulating pipe along an axial direction thereof; at least a molding unit for enclosing a channel space, the channel space having a cross-section similar in shape to a cross-section of the insulating pipe; a guiding unit for guiding a barrier film into the channel space such that the barrier film is rolled via the molding unit into a shape similar to the cross-section of the insulating pipe, so that the barrier film is encapsulated on the insulating pipe when the insulating pipe moves along an axial direction thereof and penetrates the channel space; and an adhering unit for sealing the barrier film encapsulated on the insulating pipe so as to complete the encapsulating process and resolve conventional problems in encapsulating the insulating pipes with the well-insulative and airtight barrier film.

14 Claims, 5 Drawing Sheets

BARRIER FILM ENCAPSULATING APPARATUS FOR INSULATING PIPE

BACKGROUND OF THE INVENTION

1. Field of the Invention

The invention relates to a barrier film encapsulating apparatus for insulating pipes, and more particularly, to a barrier film encapsulating apparatus for coaxially encapsulating the insulating pipes with micro-open cell foams.

2. Description of the Related Art

Typically, a cylindrical insulating pipe 7 manufactured by a extrusion die apparatus is coaxially coated by foaming as illustrated in FIG. 6. Since the wall 70 has a temperature differential from the raw material and extrusion die of the apparatus during the manufacturing process a sheath 71 (non-foaming layer) with a specific thickness is formed on a wall 70 of the insulating pipe 7. The sheath 71 has both an inner layer and an outer layer, and a micro-open cell foam material 72 for forming a chamber is encased between the inner and outer layers of the sheath 71. As long as the air in the chamber is withdrawn to vacuum, heat transfer thereof is minimized with better insulative effect to enhance functionality of the cylindrical insulating pipe 7. Similar insulating pipes whose temperatures are maintained via a micro-open cell foam material layer are disclosed in Taiwanese Patent Publication TW231746, TW263049, TW 439928, and TW 463903.

Since the micro-open cell foam material is a brittle polymeric material, the material is prone to leaking and wearing under a high vacuum environment (6-10 torr) within the chamber, thereby degrading its durability and adversely affecting the insulating effect of the insulating pipe. This creates conflicting scenarios in designing the outer layer of the insulating pipe, limiting such insulating pipe to be only adaptable to a low vacuum environment (1-2 torr) within the chamber.

Theoretically, a barrier film (also known as deposition film) may be encapsulated on the outer sheath of the insulating pipe. The deposition film is made of laminated layers of a polymeric plastic film and an anti-radiation aluminum film, wherein the number of the laminated layers depends on the actual need. With the protection and insulation of the deposition film supplemented with an anti-radiation function, effect of the vacuum suction process on the micro-open cell foam material is minimized, so as to improve its durability and insulation, solving conventional problems discussed above.

However, a major concern for the above method lies in the encapsulating process thereof. When the current insulating process is carried out by encapsulating the outer layer of the pipe with the insulating layer, ribbon-shaped insulating material is mostly encapsulated on the metallic or non-metallic pipe either by wrapping or metal adhesion. However, such encapsulating method does not yield a good sealing result even if silicon is further supplemented to fill any gap, making the entire process more complicated.

Furthermore, it is also difficult to apply the available conventional vacuum packing machines to the above encapsulating method. Since the current vacuum packing machine is designed to adapt the planar foam plate, the packing method involves disposing the foam plate in a deposition bag, followed by sucking out the air in the bag using a vacuum pump to achieve a vacuum pressure preset by the operator, and sealing by thermal compression to obtain the desired vacuum insulation panel. Apparently, it is difficult to apply this encapsulating mechanism on the insulating pipe as no match can be made for with the cross-section of the pipe for tightly encapsulating the outer circumference of the pipe, and no seal can be made by thermal compression.

Summarizing from the above, it is understood that neither the current pipe encapsulating method nor vacuum packing equipment is designed to adapt the insulation panel having micro-open cell foam material, and demands associated with encapsulating the pipe with the barrier film, sealing by thermal compression, and vacuum suction process are not satisfied as a result.

Therefore, it has been a present subject of the related research field to develop a barrier film encapsulating apparatus that achieves the desired insulation for the insulating pipes, adapts to a variety of pipes, and at the same time satisfies the requirement for mass production.

SUMMARY OF THE INVENTION

In light of the above and other drawbacks, an objective of the present invention is to provide a barrier film encapsulating apparatus for insulating pipes with an excellent insulative encapsulating.

Another objective of the present invention is to provide a barrier film encapsulating apparatus for the insulating pipe with an excellent airtight seal.

A further objective of the present invention is to provide a barrier film encapsulating apparatus for the insulating pipes, applicable to a variety of the pipes.

One other objective of the present invention is to provide a barrier film encapsulating apparatus for the insulating pipes so as to cater for fast encapsulating and mass production.

In accordance with the above and other objectives, the present invention proposes a barrier film encapsulating apparatus for insulating pipes, the apparatus comprises: a positioning unit for positioning an insulating pipe to be encapsulated with a barrier film and moving the insulating pipe along an axial direction thereof; at least a molding unit for enclosing a channel space, the channel space having a cross-section similar in shape to a cross-section of the insulating pipe; a guiding unit for guiding a barrier film into the channel space such that the barrier film is rolled via the molding unit into a shape similar to the cross-section of the insulating pipe, so that the barrier film is encapsulated on the insulating pipe when the insulating pipe moves along an axial direction thereof and penetrates the channel space; and an adhering unit for sealing the barrier film encapsulated on the insulating pipe.

According to the present invention, each of the insulating pipes has an outer layer that includes a micro-open cell foaming material layer, and the insulating pipe has a cross-section in a round, oval, or polygonal shape. And a portion of the barrier film not within the channel space is in a planar shape and encapsulats the insulating pipe by rolling.

The above-mentioned positioning unit includes two sets of positioning wheel assembly formed respectively on a moving track of the insulating pipe and is spaced from each other by a distance. The positioning wheel assembly further includes three rollers arranged in different orientations and rotated to actuate a movement of the insulating pipe. The molding unit includes at least two pieces of arc-shaped molding plates enclosed to form the channel space.

The above-mentioned guiding unit includes a wheel axis formed with the unguided portion of the barrier film, a tension control member for controlling a guiding tension of the barrier film, and a guiding roller set for conveying the barrier film. The unguided portion of the barrier film is positioned to the wheel axis via an expansion key on the wheel axis. Also, the adhering unit is a thermal compression roller set having a thermal compression temperature of about 80° C. to 170° C. and a thermal compression pressure of about 6 to 20 kg/cm².

Therefore, the present invention proposed a barrier film encapsulating apparatus that solves problems associated with encapsulating the insulating pipes by conventional methods and packing equipment, so that an insulative and air-tight encapsulating is achieved through the design of the present invention to benefit the subsequent vacuum process and suits for the mass production and different types of pipes.

To provide a further understanding of the invention, the following detailed description illustrates embodiments and examples of the invention, it is to be understood that this detailed description is being provided only for illustration of the invention and not as limiting the scope of this invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

The present invention is described in the following with specific embodiments, so that one skilled in the pertinent art can easily understand other advantages and effects of the present invention from the disclosure of the invention. The present invention may also be implemented and applied according to other embodiments, and the details may be modified based on different views and applications without departing from the spirit of the invention.

Figure 1A:
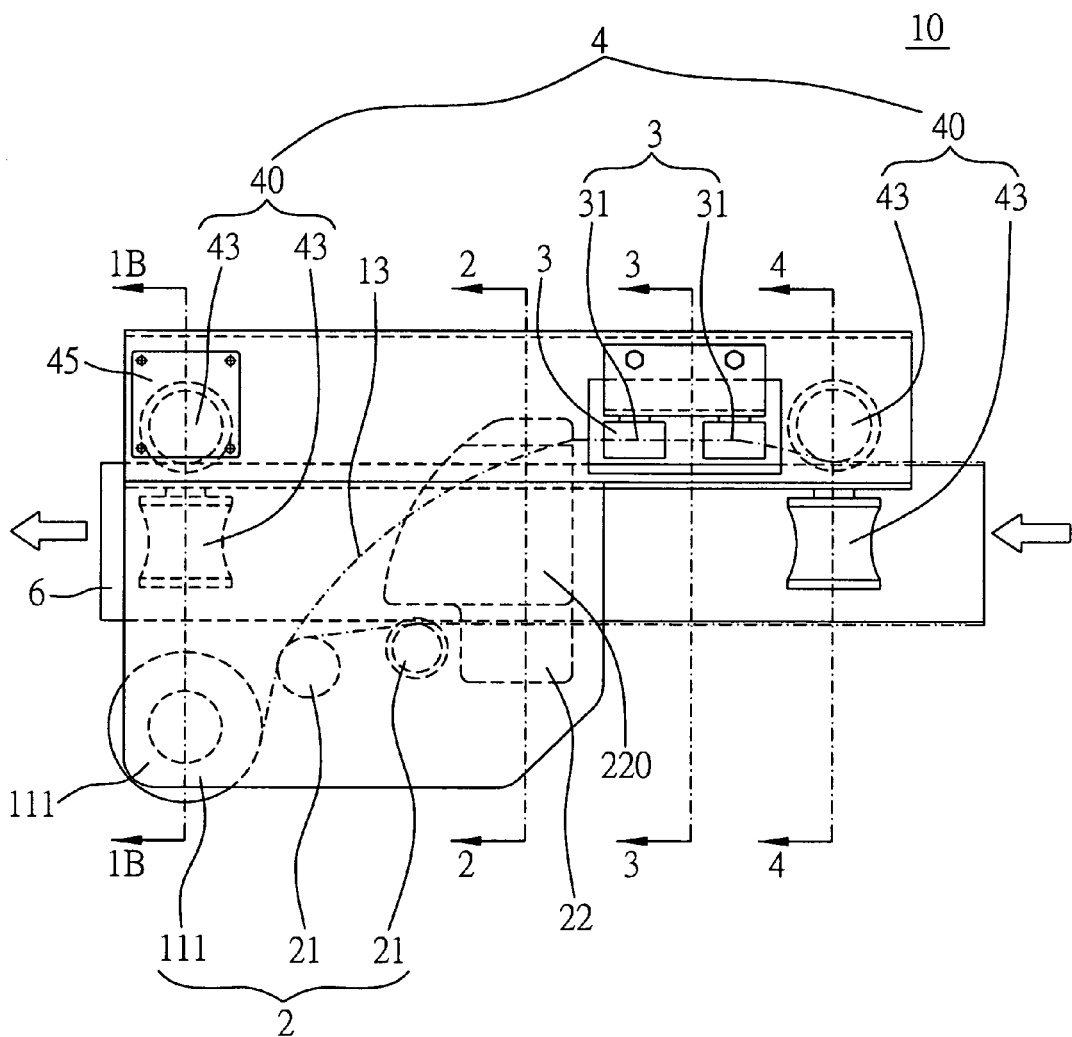
FIG. 1A is a side view of a barrier film encapsulating apparatus according to the present invention.
Figure 1B:
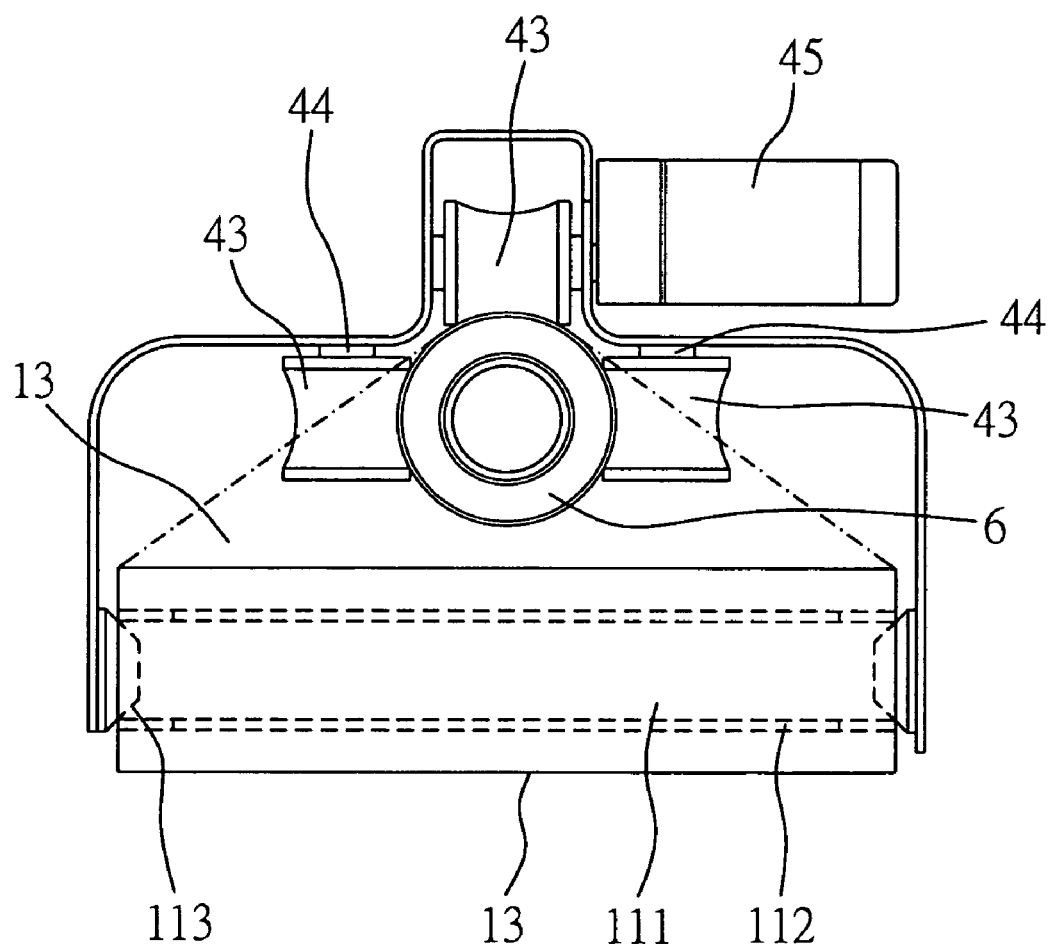
FIG. 1B is a front view of the barrier film encapsulating apparatus according to the present invention.
Figure 2:
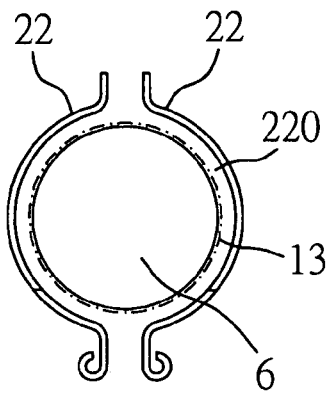
FIG. 2 is a front view of a molding unit according to the present invention.

According to one preferred embodiment of the present invention, a barrier film encapsulating apparatus for an insulating pipe is illustrated in FIGS. 1A and 1B. The barrier film encapsulating apparatus has a positioning unit 4 that includes two positioning wheel sets 40 for positioning the insulating pipe 6 that is subsequently encapsulated with a barrier film 13 within the apparatus. By rotating the positioning wheel sets 40, the insulating pipe 6 is driven to move along its axial direction (as indicated by the arrow) while the barrier film 13 is encapsulated thereon. A portion of the barrier film 13 not yet involved in encapsulating is in a planar shape and disposed on a wheel axis 111 of a guiding unit 2. The portion of the barrier film is then guided via the guiding unit 2 and conveyed into a channel space 220 formed by enclosing two molding units 22. The two molding units 22 may be arc-shaped molding plates. And as illustrated in FIG. 2, the channel space 220 has a cross-section similar in shape (such as round, oval, or polygonal shape) to that of the insulating pipe 6. Accordingly, as the insulating pipe 6 is driven by the positioning unit 4 to move along the axial direction of the insulating pipe 6 and insert in the channel space 220, the portion of the barrier film 13 which is guided via the guiding unit 2 into the channel space 220 is rolled into a shape similar to the cross-section of the channel space 220, that is, similar in shape to the cross-section of the insulating pipe 6. Thus, the barrier film 13 is encapsulated on an outer wall of the insulating pipe 6 in the channel space 220 to complete tight encapsulating of the barrier film 13.

The barrier film encapsulating apparatus 10 further includes an adhering unit 3 that is formed between the two positioning wheel sets 40 and located on a side opposite to the direction to which the insulating pipe 6 moves. The adhering unit 3 is a thermal compression roller set 31 positioned right behind the molding units 22 (in terms of the direction to which the insulating pipe 6 moves), such that the barrier film 13 that rolls and coats on the insulating pipe 6 is subjected to the thermal compression reaction to achieve an adhesive seal.

The present embodiment is described with the insulating pipe 6 having a round cross-section as an example. So, the two molding plates 22 are also illustrated in FIG. 2 as the molding plates each having an arc, so as to enclose the channel space 220 having a round cross-section, allowing the cylindrical insulating pipe 6 to insert therethrough. And as the planar barrier film 13 enters the channel space 220, the barrier film 13 is rolled into a cylinder to tightly encapsulat a section of the cylindrical insulating pipe 6 received in the channel space 220.

An outer layer of the insulating pipe 6 has a micro-open cellular foaming material layer (not shown), and the micro-open cellular foaming material layer, is in turn encapsulated with the barrier film 13. Also, the barrier film 13 may be an insulative film, and preferably a polymer plastic film having an anti-ultra violet (UV) aluminum film layer is adopted in the present embodiment.

Next, a detailed structure for the barrier film encapsulating apparatus of the present invention is further described in the followings. As illustrated in FIG. 1A, the positioning unit includes two positioning wheel sets 40 formed respectively on a movement path of the insulating pipe 6 and spaced apart by a distance. The two positioning wheel sets 40 may be rotated to drive movement of the insulating pipe 6 along its axial direction and serve to position the insulating pipe 6 without warping. The positioning is achieved via a roller design of the positioning wheel sets 40 illustrated in FIG. 1B. Each of the positioning wheel sets 40 includes three rotatable rollers 43 arranged in different orientations such that the insulating pipe 6 is positioned by clamping within the positioning wheel sets 40 via the three rollers 43. Depending on the dimension and cross-section of the insulating pipe 6, a distance between each roller 43 and the insulating pipe 6 may be adjusted by an adjustment member 44. The positioning wheel set 40 at the front end is connected to a driving motor 45 so as to drive rotation of the positioning wheel set 40 via power of the driving motor and to drive movement of the insulating pipe 6 along its axial direction at a speed that depends on actual encapsulating demand.

As illustrated in FIGS. 1A and 1B, the guiding unit 2 includes a wheel axis 111, a tension control member 113 for controlling guiding tension of the barrier film 13, and a guiding roller set 21 for conveying the barrier film 13. A portion of unguided planar barrier film 13 is rolled around the wheel axis 111 and positioned via an expansion key 112 on the wheel axis 111. As the wheel axis 111 is rotated to initiate conveying guidance, the barrier film 13 on the wheel axis 111 is guided to the guiding roller set 21 and the tension control member 113 controls the guiding tension during the process. In addition, the guiding roller set 21 has two guiding rollers 21 as illustrated in FIG. 1A and functions to pull up the barrier film 13 before the barrier film 13 guided into the channel space 220 enclosed by the two molding plates 22.

Figure 3:
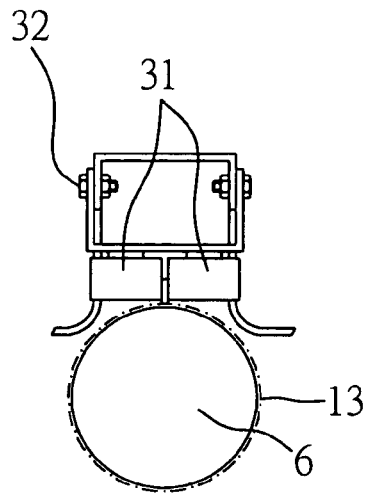
FIG. 3 is a front view of an adhering unit according to the present invention.
Figure 5:
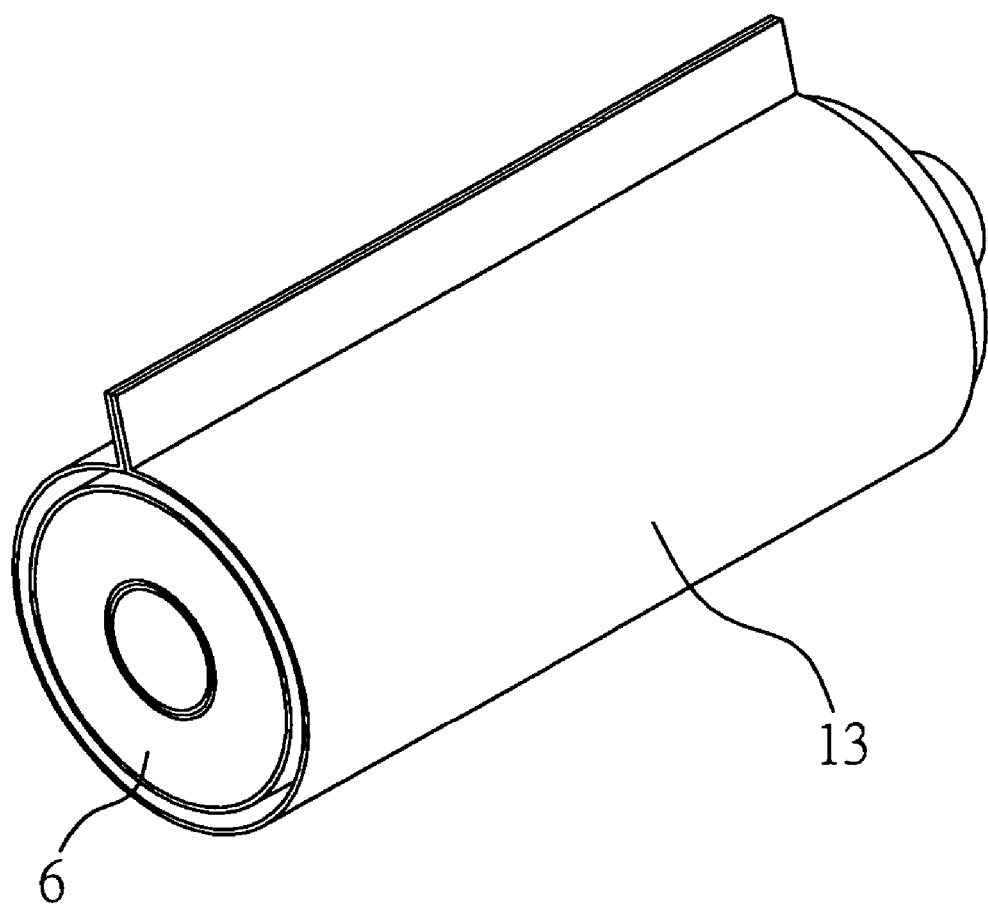
FIG. 5 is a schematic diagram illustrating the insulating pipe encapsulated with the barrier film according to the present invention.
Figure 6:
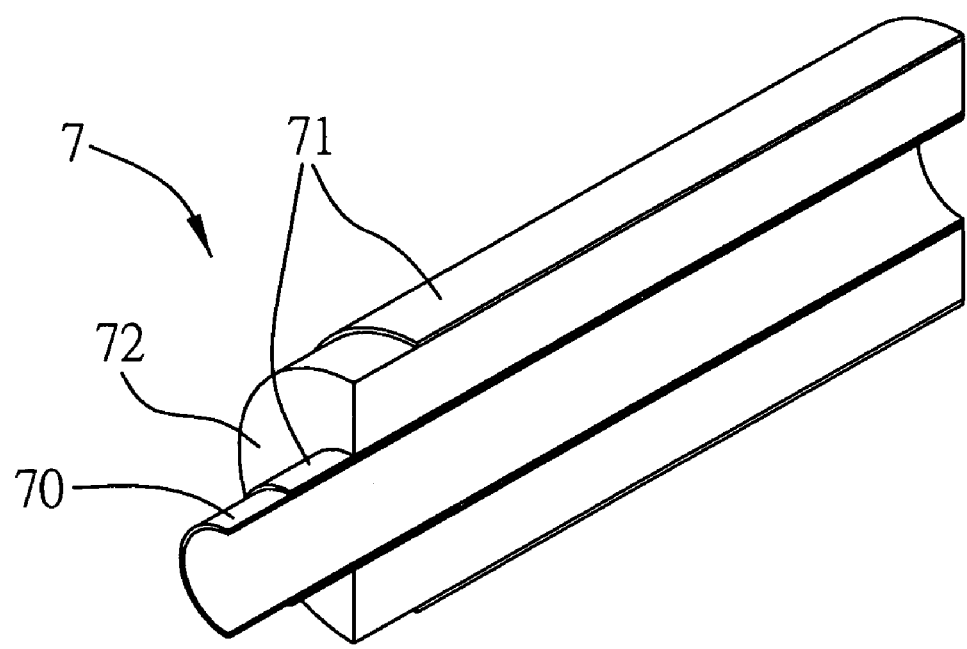
FIG. 6 is a schematic diagram illustrating the insulating pipe having a micro-open cell foam material layer according to the present invention.

Referring to FIG. 1A, the adhering unit 3 is a thermal compression roller set 31 whose front view is illustrated in FIG. 3. And depending on the material characteristics of the barrier film 13, the temperature and pressure at which the barrier film 13 is adhered may be preset such that the barrier film 13 that rolls into a barrel and encapsulats on the outer surface of the insulating pipe 6 is sealed air tight. This completes the step of encapsulating the barrier film 13 illustrated in FIG. 5. Generally, the thermal compression roller set 31 is set with a compression temperature of about 80-170.degree. C. and a compression pressure of about 6-20 kg/cm.sup.2. As illustrated in FIG. 3, the adhering unit 3 may further include a gap adjustment member 32 for adjusting an adhering length of the barrier film 13. For doing this, the gap adjustment member 32 adjusts a distance between the thermal compression roller set 31 and the insulating pipe 6.

Figure 4:
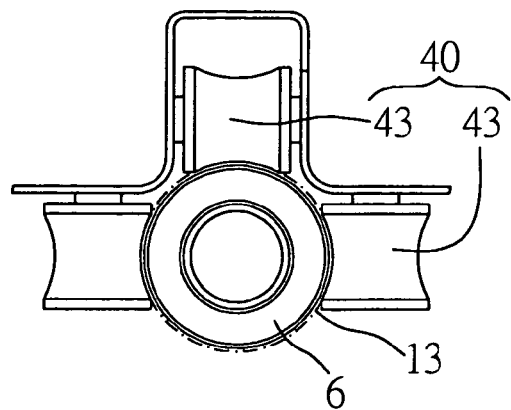
FIG. 4 is a front view of a rear positioning wheel set according to the present invention.

After the adhesion is complete, the barrier film 13 may be further subjected to edge-folding which involves the above-mentioned thermal compression roller set 31 and the positioning wheel set 40 (whose front view is illustrated in FIG. 4) in the barrier film encapsulating apparatus 10 of the present invention. With the movement of the insulating pipe along its axial direction, an adhering side of the barrier film 13 that is completed with adhesion in the thermal compression roller set 31 moves into the positioning wheel set 40 at the rear end. Referring to FIG. 1A, the edge folding is carried out as a result of compression via the rollers 43 of the positioning wheel set 40.

Therefore, the barrier film encapsulating apparatus resolves conventional limitations in terms of the vacuum packing the pipe, so as to achieve excellent insulative encapsulating and airtight seal for the pipe, both beneficial to requirements in the subsequent vacuum suction process. Moreover, with the molding unit design, the cross-section and dimension of the channel space are modified to match with the dimension and cross-section of the pipe, so that the barrier film 13 can be rolled into different shapes applicable to a variety of the pipes, resulting benefits for fast encapsulating and mass production.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A barrier film encapsulating apparatus for an insulating pipe, the apparatus comprising:

a positioning unit for positioning an insulating pipe to be coated with a barrier film and moving the insulating pipe along an axial direction thereof;

at least a molding unit for including at least two pieces of arc-shaped molding plates to form a channel space, the channel space having a modifiable cross-section similar in shape to a cross-section of the insulating pipe;

a guiding unit for guiding a barrier film into the channel space such that the barrier film is rolled via the molding unit into a shape similar to the cross-section of the insulating pipe, so that the barrier film is coated on the insulating pipe when the insulating pipe moves along an axial direction thereof and penetrates the channel space; and an adhering unit for sealing the barrier film coated on the insulating pipe.

2. The barrier film encapsulating apparatus of claim 1, wherein an outer layer of the insulating pipe includes a micro-open cell foaming material layer.

3. The barrier film encapsulating apparatus of claim 1, wherein the cross-section of the insulating pipe is in a round shape.

4. The barrier film encapsulating apparatus of claim 1, wherein the cross-section of the insulating pipe is in an oval shape.

5. The barrier film encapsulating apparatus of claim 1, wherein the cross-section of the insulating pipe is in a polygonal shape.

6. The barrier film encapsulating apparatus of claim 1, wherein a portion of the barrier film not guided into the channel space is in a planar shape.

7. The barrier film encapsulating apparatus of claim 1, wherein the barrier film is an insulating film.

8. The barrier film encapsulating apparatus of claim 1, wherein the barrier film is a polymer plastic film having an anti-radiation aluminum film layer.

9. The barrier film encapsulating apparatus of claim 1, wherein the positioning unit includes two sets of positioning wheel assembly formed respectively on a moving track of the insulating pipe and is spaced from each other by a distance.

10. The barrier film encapsulating apparatus of claim 9, wherein the positioning wheel assembly includes three rollers arranged in different orientations and rotated to actuate a movement of the insulating pipe.

11. The barrier film encapsulating apparatus of claim 9, wherein the positioning wheel assembly is driven by a transmission motor.

12. The barrier film encapsulating apparatus of claim 1, wherein the guiding unit includes a wheel axis formed with the unguided portion of the barrier film, a tension control member for controlling a guiding tension of the barrier film, and a guiding roller set for conveying the barrier film.

13. The barrier film encapsulating apparatus of claim 1, wherein the adhering unit is a thermal compression roller set.

14. The barrier film encapsulating apparatus of claim 13, wherein the thermal compression roller set having a thermal compression temperature of about 80° C. to 170° C. and a thermal compression pressure of about 6 to 20 kg/cm2.

* * * * *